United States Patent
Tobari et al.

(10) Patent No.: US 10,189,968 B2
(45) Date of Patent: Jan. 29, 2019

(54) VARNISH FOR POROUS POLYIMIDE FILM PRODUCTION AND METHOD FOR PRODUCING POROUS POLYIMIDE FILM USING SAME

(71) Applicant: Tokyo Ohka Kogyo Co., Ltd., Kanagawa (JP)

(72) Inventors: Mitsuharu Tobari, Kanagawa (JP); Masanori Ichikawa, Kanagawa (JP); Kaoru Ishikawa, Kanagawa (JP); Tsukasa Sugawara, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 15/504,714

(22) PCT Filed: Aug. 19, 2015

(86) PCT No.: PCT/JP2015/073205
§ 371 (c)(1),
(2) Date: Feb. 17, 2017

(87) PCT Pub. No.: WO2016/027825
PCT Pub. Date: Feb. 25, 2016

(65) Prior Publication Data
US 2018/0009962 A1    Jan. 11, 2018

(30) Foreign Application Priority Data
Aug. 20, 2014    (JP) .................................. 2014-167358

(51) Int. Cl.
| | |
|---|---|
| *C08J 9/26* | (2006.01) |
| *B32B 5/22* | (2006.01) |
| *C08J 5/18* | (2006.01) |
| *C09D 179/08* | (2006.01) |
| *C08G 73/10* | (2006.01) |

(52) U.S. Cl.
CPC ............ *C08J 9/26* (2013.01); *B32B 5/22* (2013.01); *C08G 73/105* (2013.01); *C08G 73/1071* (2013.01); *C08J 5/18* (2013.01); *C09D 179/08* (2013.01); *C08J 2201/0442* (2013.01); *C08J 2333/24* (2013.01); *C08J 2379/08* (2013.01)

(58) Field of Classification Search
CPC ............ C08J 9/26; C08J 5/18; C08J 2333/24
See application file for complete search history.

(56) References Cited

U.S. PATENT DOCUMENTS

| | | |
|---|---|---|
| 6,426,372 B1 | 7/2002 | Minami et al. |
| 9,601,739 B2 | 3/2017 | Sugawara et al. |
| 9,911,955 B2 | 3/2018 | Sugawara et al. |
| 2004/0101626 A1 | 5/2004 | Kanada et al. |
| 2014/0329130 A1* | 11/2014 | Kanamura ............ H01M 2/145 429/144 |
| 2016/0072110 A1 | 3/2016 | Sugawara et al. |
| 2017/0187021 A1 | 6/2017 | Sugawara et al. |

FOREIGN PATENT DOCUMENTS

| | | | |
|---|---|---|---|
| CN | 102417604 | | 4/2012 |
| CN | 104853919 | | 8/2015 |
| JP | 2000-44719 | | 2/2000 |
| JP | 2000-191823 | | 7/2000 |
| JP | 2003-26850 | | 1/2003 |
| JP | 2007-211136 | | 8/2007 |
| JP | 2012-107144 | | 6/2012 |
| JP | 2012107144 A | * | 6/2012 |
| JP | 2013/109843 | | 6/2013 |
| WO | 2013/084368 | | 6/2013 |
| WO | WO 2013/084368 | * | 6/2013 |

OTHER PUBLICATIONS

International Search Report dated Oct. 6, 2015 in International (PCT) Application No. PCT/JP2015/073205.
Notification of Reasons for Refusal issued in corresponding Chinese patent application No. 201580044220.7, dated Nov. 30, 2018.

* cited by examiner

*Primary Examiner* — Kara B Boyle
(74) *Attorney, Agent, or Firm* — Wenderoth, Lind & Ponack, L.L.P.

(57) ABSTRACT

Provided are a varnish for porous polyimide film production, providing an unburned composite film that is less likely to have a sea-island structure, and a method for producing a porous polyimide film using the same. The varnish according to the present invention comprises a resin including polyamide acid and/or polyimide, fine particles, and a solvent, and has a fine particle content of not less than 65% by volume relative to the total of the resin and the fine particles and a viscosity at 25° C. of not less than 550 mPa·s. Preferably, the varnish further comprises a dispersant. The method for producing a porous polyimide film according to the present invention comprises: forming an unburned composite film using the varnish; burning the unburned composite film to obtain a polyimide-fine particle composite film; and removing the fine particles from the polyimide-fine particle composite film.

8 Claims, No Drawings

VARNISH FOR POROUS POLYIMIDE FILM PRODUCTION AND METHOD FOR PRODUCING POROUS POLYIMIDE FILM USING SAME

TECHNICAL FIELD

The present invention relates to a varnish for porous polyimide film production and a method for producing a porous polyimide film using the same.

BACKGROUND ART

In recent years, porous polyimide has been researched as a separator of a lithium-ion battery, a fuel cell electrolyte film, a film for separating a gas or liquid, or a low dielectric constant material.

For example, well-known are a method for making porous by using a specific mixture solvent for a polyamide acid solution, a method for making porous by subjecting polyamide acid including a hydrophilic polymer to thermal imidization, followed by removing the hydrophilic polymer, and a method for making porous by removing silica from polyimide containing silica particles, and the like (see Patent Documents 1 to 3).

Patent Document 1: Japanese Unexamined Patent Application, Publication No. 2007-211136
Patent Document 2: Japanese Unexamined Patent Application, Publication No. 2000-044719
Patent Document 3: Japanese Unexamined Patent Application, Publication No. 2012-107144

DISCLOSURE OF THE INVENTION

Problems to be Solved by the Invention

Among them, the method for making porous by removing silica from polyimide containing silica particles is an effective method capable of producing a homogeneous and dense porous polyimide film. In the production method, an unburned composite film containing polyamide acid and silica particles is required to be formed on a substrate by using a varnish for porous polyimide film production containing polyamide acid and silica particles.

The present inventors have studied and found that when a conventional varnish for porous polyimide film production is used, a so-called sea-island structure (a structure in which polyamide acid and silica particles are phase-separated, and a large number of island portions are scattered) is generated on a surface of the above-mentioned unburned composite film, and scale patterns are generated on a surface of a porous polyimide film obtained from the unburned composite film.

The present invention has been made in view of such conventional circumstances, and an object of the present invention is to provide a varnish for porous polyimide film production, the varnish providing an unburned composite film that is less likely to have a sea-island structure, and a method for producing a porous polyimide film using the same.

Means for Solving the Problems

In order to solve the above-mentioned problems, the present inventors have conducted extensive studies. As a result, they have found that the above-mentioned problems can be solved by using a varnish for porous polyimide film production, the varnish containing a predetermined amount of fine particles and having a specific range of viscosity, and they have arrived at the present invention. Specifically, the present invention provides the followings.

A first aspect of the present invention relates to a varnish for porous polyimide film production, the varnish containing a resin including polyamide acid and/or polyimide, fine particles, and a solvent. The content of the fine particle is not less than 65% by volume with respect to the total of the resin and the fine particles, and a viscosity at 25° C. of the varnish is not less than 550 mPa·s.

A second aspect of the present invention relates to a method for producing a porous polyimide film, the method including: an unburned composite film forming step of forming an unburned composite film using the varnish for porous polyimide film production in accordance with the present invention; a burning step of burning the unburned composite film to obtain a polyimide-fine particle composite film; and a fine particle-removing step of removing the fine particles from the polyimide-fine particle composite film.

Effects of the Invention

The present invention can provide a varnish for porous polyimide film production, providing an unburned composite film that is less likely to have a sea-island structure, and a method for producing a porous polyimide film using the same.

PREFERRED MODE FOR CARRYING OUT THE INVENTION

Embodiments of the present invention will now be described in detail, but the present invention is not necessarily limited to the following embodiments and can be implemented with appropriate modifications within the purpose of the present invention.

Varnish for Porous Polyimide Film Production

A varnish for porous polyimide film production according to the present invention contains a resin including polyamide acid and/or polyimide, fine particles, and a solvent. The content of fine particle is not less than 65% by volume with respect to the total of the resin and the fine particles and a viscosity at 25° C. of the varnish is not less than 550 mPa·s. Since the varnish for porous polyimide film production according to the present invention contains a predetermined amount of fine particles as mentioned above and has a predetermined range of viscosity, it can provide an unburned composite film that is less likely to have a sea-island structure.

When the content of fine particles is not less than 65% by volume with respect to the total of the resin and the fine particles, the porosity of the resulting porous polyimide film is not easily reduced, and the contraction rate at the time of burning of the resulting unburned composite film is not easily increased, thus easily suppressing generation of curing or wrinkles.

The upper limit of the content of the fine particles is preferably not more than 80% by volume with respect to the total of the resin and the fine particles. When the upper limit of the content of the fine particles is in the above-mentioned range, aggregation of fine particles is prevented, and cracking and the like is not easily generated. Consequently, porous polyimide films having excellent electrical characteristic can be formed stably.

Note here that in this specification, values of "% by volume" and "volume ratio" are values at 25° C.

Furthermore, in the varnish for porous polyimide film production according to the present invention, the content of the total of the fine particles and the resin including polyamide acid and/or polyimide is preferably, for example, not less than 90% by mass, more preferably not less than 95% by mass with respect to the entire solid content of the varnish for porous polyimide film production (entire components excluding the below-mentioned solvents), and further preferably is adjusted to substantially 99 to 100% by mass from the viewpoint of stability of various production process.

The viscosity at 25° C. of the varnish for porous polyimide film production according to the present invention is not less than 550 mPa·s, preferably not less than 600 mPa·s, and more preferably not less than 700 mPa·s. When the viscosity is not less than 550 mPa·s, an unburned composite film formed and produced using the resulting varnish has less likely to cause a sea-island structure. The upper limit of the viscosity is not particularly limited, but from the practical viewpoint, the upper limit is not more than 3000 mPa·s, preferably not more than 2000 mPa·s, and more preferably not more than 1500 mPa·s. Note here that the viscosity is measured by using E-type viscometer.

The varnish for porous polyimide film production according to the present invention is prepared by producing a solution including a resin including polyamide acid and/or polyimide and in which fine particles are dispersed. More specifically, the varnish for porous polyimide film production according to the present invention is prepared by, for example, mixing a solvent in which fine particles have been dispersed in advance and a resin including polyamide acid and/or polyimide at any ratios, or by polymerizing a resin including polyamide acid and/or polyimide in a solvent in which fine particles have been dispersed in advance. Any fine particles can be used without particular limitation as long as they are insoluble in the solvent to be used for the varnish and can be selectively removed after film formation.

[Polyamide Acid]

The polyamide acid used in the present invention may be any one prepared by polymerizing appropriate tetracarboxylic dianhydride and diamine. The amounts of the tetracarboxylic dianhydride and the diamine are not particularly limited, and the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among these tetracarboxylic dianhydrides, 3,3',4,4'-biphenyltetracarboxylic dianhydride and pyromellitic dianhydride are preferred because of their inexpensiveness and ready availability. These tetracarboxylic dianhydrides may be used alone or as a mixture of two or more thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. These diamines may be used in a combination of two or more thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

The diaminodiphenyl compounds are obtained by linkage of two aminophenyl groups at their phenyl groups. For example, the diaminodiphenyl compounds are 4,4'-diaminobiphenyl and 4,4'-diamino-2,2'-bis(trifluoromethyl)biphenyl.

Alternatively, the diaminodiphenyl compounds are obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The alkylene linkage is a linkage of an alkylene having about 1 to 6 carbon atoms, and its derivative group is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)- benzene, 4,4'-bis(4-aminophenoxy)biphenyl, bis[4-(4-aminophenoxy)phenyl]sulfone, bis[4-(3-aminophenoxy)phenyl]sulfone, 2,2-bis[4-(4-aminophenoxy)phenyl]propane, and 2,2-bis[4-(4-aminophenoxy)phenyl]hexafluoropropane.

Among these, p-phenylenediamine, m-phenylenediamine, 2,4-diaminotoluene, and 4,4'-diaminodiphenylether are preferred because of their inexpensiveness and ready availability.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

An example of the cardo-type fluorenediamine derivatives is 9,9-bisanilinefluorene.

Preferably, the aliphatic diamine has, for example, about 2 to 15 carbon atoms, and specifically, examples thereof include pentamethylenediamine, hexamethylenediamine, and heptamethylenediamine.

The aliphatic diamine may be a compound having at least one substituent selected from the group consisting of halogen atoms and methyl, methoxy, cyano, and phenyl groups for hydrogen atoms of the diamine.

The polyamide acid to be used in the present invention may be produced by any method and, for example, can be produced by a known method, for example, by reacting an acid and a diamine component in a solvent.

The reaction of a tetracarboxylic dianhydride and a diamine is usually performed in a solvent. The solvent to be used for the reaction of a tetracarboxylic dianhydride and a diamine may be any solvent that can dissolve the tetracarboxylic dianhydride and the diamine without reacting with the tetracarboxylic dianhydride and the diamine. The solvent may be a single solvent or a mixture of two or more solvents.

Examples of the solvent to be used for the reaction of a tetracarboxylic dianhydride and a diamine include nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols. These solvents may be used alone or as a mixture of two or more thereof. The amount of the solvent is not particularly limited but is desirably such that the content of the resulting polyamide acid is 5% to 50% by mass.

Among these solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition and is usually 3 to 24 hours (hr).

The polyamide acid may be used singly or in a combination of two or more thereof.

[Polyimide]

The polyimide used in the present invention can be any known polyimide, without any limitation to its structure and molecular weight, as long as the polyimide is soluble in the solvent to be used in the varnish of the present invention. The side chain of the polyimide may have a condensable functional group, such as a carboxy group, or a functional group enhancing the cross-linking reaction during burning.

In order to make the polyimide soluble in a solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in a solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility.

The polyimide soluble in a solvent to be used in the present invention may be produced by any method and, for example, can be produced by a known method of, for example, chemically imidizing or thermally imidizing a polyamide acid and dissolving the imidized polyamide in a solvent. Examples of such polyimides include aliphatic polyimide (full-aliphatic polyimides) and aromatic polyimides, and aromatic polyimides are preferred. The aromatic polyimide may be one prepared by a thermal or chemical ring-closing reaction of a polyamide acid having repeating units represented by Formula (1) or one prepared by dissolving a polyimide having repeating units represented by Formula (2) in a solvent. In the formulae, Ar represents an aryl group.

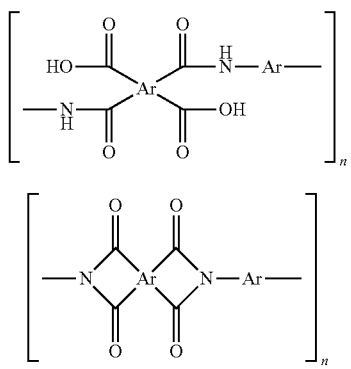

The varnish of the present invention can be produced by mixing a resin including polyamide acid and/or polyimide with a solvent in which fine particles are dispersed in advance at an appropriate ratio, or by polymerizing a tetracarboxylic dianhydride and a diamine into a polyamide acid in a solvent in which fine particles are dispersed in advance, or by further performing imidization into a polyimide.

When fine particles and a resin including polyamide acid and/or polyimide are burned into a polyimide-fine particle composite film and when the material of the fine particles is an inorganic material described below, the fine particles and the resin including polyamide acid and/or polyimide may be mixed with each other such that the ratio of the fine particles to the polyimide is 2 to 6 (mass ratio). The ratio is more preferably 3 to 5 (mass ratio). When the material of the fine particles is an organic material described below, the fine particles and the resin including polyamide acid and/or polyimide may be mixed with each other such that the ratio of the fine particles to the polyimide is 1 to 3.5 (mass ratio). The ratio is more preferably 1.2 to 3 (mass ratio). Alternatively, the fine particles and the resin including polyamide acid and/or polyimide may be mixed with each other such that the volume ratio of the fine particles to the polyimide is 1.5 to 4.5 when a polyimide-fine particle composite film is formed. The ratio is more preferably 1.8 to 3 (volume ratio). When the mass ratio or volume ratio of the fine particles to the polyimide is not lower than the lower limit in a polyimide-fine particle composite film, the film can have pores at an appropriate density as a separator. When the mass ratio or volume ratio is not higher than the upper limit, a film can be stably formed without causing problems such as an increase in viscosity or cracking in the film.

The polyimide may be used singly or in a combination of two or more thereof.

[Fine Particles]

The material of the fine particles used in the present invention is not particularly limited and may be any known material as long as the material is insoluble in the solvent used in the varnish and can be removed later from the polyimide film. Examples of the inorganic material include metal oxides, such as silica (silicon dioxide), titanium oxide, and alumina ($Al_2O_3$). Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers.

Specific examples of the fine particles include colloidal silica. In particular, it is preferable to select monodisperse spherical silica particles because uniform pores can be formed.

The fine particles to be used in the present invention preferably have a high sphericity and a low particle diameter distribution index. Fine particles satisfying these requirements show excellent dispersibility in the varnish and can be used without causing aggregation with one another. The average particle diameter of the fine particles is preferably, for example, 100 to 2000 nm, more preferably 300 to 2000 nm, further preferably 500 to 2000 nm, and particularly preferably 700 to 2000 nm. It is preferable that the fine particles satisfying these requirements can provide pores having uniform pore diameters to the porous film by removing the fine particles and can homogenize the electric field to be applied to the separator. The particle diameter distribution index (d25/d75) of the fine particles to be used in the present invention is preferably, for example, more than 1.5, more preferably not less than 1.6 and not more than 5, and further more preferably not less than 1.8 and not more than 4. When the particle diameter distribution index satisfies the above-mentioned range, the inside of film can be filled with particles efficiently, and a passage for allowing pores inside the obtained porous polyimide film to be communicated with each other can be easily formed.

The fine particles may be used singly or may be used in a combination of two or more thereof.

[Solvent]

As the solvent to be used in the present invention, those described as an example of the solvents used for reaction between tetracarboxylic dianhydride and diamine can be used without limitation as long as the solvents can solve the resin including polyamide acid and/or polyimide and does not solve the fine particles. The solvent may be used singly or may be used in a combination of two or more thereof.

From the view point of the applicability, it is preferable that the content of a solvent in the varnish for porous polyimide film production according to the present invention is not less than 60% by mass with respect to the entire varnish for porous polyimide film production (that is, an amount corresponding to the solid content concentration in the varnish for porous polyimide film production becomes not more than 40% by mass). The content of the solvent is an amount corresponding to the solid content concentration in the varnish for porous polyimide film production of more preferably 20 to 40% by mass, further preferably 30 to 39% by mass, and further more preferably 33 to 38% by mass. When the content of the solvent (or the solid content concentration) is in the above-mentioned range, a sea-island structure is less likely to occur on the surface of the resulting unburned composite film.

[Dispersing Agent]

In the present invention, the varnish may further contain a dispersant in addition to the fine particles, in order to uniformly disperse the fine particles in the varnish. The addition of the dispersant allows further uniform mixing of the resin including polyamide acid and/or polyimide with the fine particles, and, in addition, allows uniform dispersion of the fine particles in the molded or formed precursor film. As a result, dense apertures are provided on the surface of the finally formed porous polyimide, and the front and rear surfaces can be efficiently communicated with each other so as to improve the air permeability of the film. Furthermore, addition of the dispersant easily improves drying of the varnish for porous polyimide film production according to the present invention, and easily improves peelability of the formed unburned composite film from the substrate and the like.

The dispersant used in the present invention is not particularly limited and may be any known one. Examples of the dispersant include, but not limited to, anionic surfactants, such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters, such as octyl stearate and trimethylolpropane tridecanoate; and polyether polyols, such as polyoxyalkylene butyl ether, polyoxyalkylene oleyl ether, and trimethylol propane tris(polyoxyalkylene) ether. These dispersants may be used as a mixture of two or more thereof.

From the view point of the film formability, it is preferable that the content of the dispersant in the varnish for porous polyimide film production according to the present invention is, for example, 0.01 to 5% by mass with respect to the fine particles, and the content is more preferably 0.05 to 1% by mass, and further more preferably 0.1 to 0.5% by mass.

Method for Producing Porous Polyimide Film

A method for producing a porous polyimide film according to the present invention includes an unburned composite film forming step of forming an unburned composite film using a varnish for porous polyimide film production according to the present invention; a burning step of burning the unburned composite film to obtain a polyimide-fine particle composite film; and a fine particle-removing step for removing the fine particles from the polyimide-fine particle composite film.

[Method for Forming Unburned Composite Film (Unburned Composite Film Forming Step)]

A method for forming an unburned composite film in the present invention will now be described. In an unburned composite film forming step, an unburned composite film is formed using a varnish for porous polyimide film production according to the present invention. At this time, the unburned composite film may be formed on a substrate or on a lower film that is different from the unburned composite film. The unburned composite film can be formed by, for example, applying a varnish for porous polyimide film production according to the present invention onto the substrate or the lower film, and drying thereof at normal pressure or under vacuum at 0 to 100° C., and preferably at normal pressure at 10 to 100° C.

Examples of the substrate include a PET film, a SUS substrate, a glass substrate, and the like.

Examples of the lower film include a lower unburned composite film formed using a varnish for a lower film containing a resin including polyamide acid and/or polyimide, fine particles, and a solvent, wherein the content of the fine particles is more than 65% by volume and not more than 81% by volume with respect to the total of the resin and the fine particles. The lower unburned composite film may be a film formed on the substrate. When the content of the fine particles is more than 65% by volume, the particles are uniformly dispersed, and when the content of the fine particles is not more than 81% by volume, the particles are dispersed without causing aggregation with one another to allow uniform formation of pores in the porous polyimide film. Furthermore, when the content of the fine particles is within the above-mentioned range, when the lower unburned composite film is formed on the substrate, even when the substrate is not provided with a mold release layer in advance, mold releasability after film formation can be easily secured.

Note here that the fine particles to be used for the varnish for the lower film and the fine particles to be used for the varnish for porous polyimide film production according to the present invention may be the same as or different from each other. In order to increase the density of pores in the lower unburned composite film, it is preferable that the fine particles to be used for the varnish for the lower film has a particle diameter distribution index that is equal to or smaller than that of the fine particles to be used for the varnish for porous polyimide film production according to the present invention. Alternatively, it is preferable that the fine particles to be used for the varnish for the lower film has a sphericity that is equal to or smaller than that of the fine particles to be used for the varnish for porous polyimide film production according to the present invention.

Furthermore, it is preferable that an average particle diameter of the fine particles to be used for the varnish for a lower film is smaller than that of the fine particles to be used for the varnish for porous polyimide film production according to the present invention. It is particularly preferable that the average particle diameter of the fine particles to be used for the varnish for a lower film is 100 to 1000 nm (preferably 100 to 600 nm), and the average particle diameter of the fine particles to be used for the varnish for porous polyimide film production according to the present invention is preferably 300 to 2000 nm (more preferably 500 to 2000 nm, and further more preferably 700 to 2000 nm).

Furthermore, it is preferable that the content of fine particles in the varnish for a lower film is larger than that of the varnish for porous polyimide film production according to the present invention. The resin including polyamide acid and/or polyimide, the fine particle, the solvent, and the substrate are as mentioned above. The lower unburned composite film can be formed by, for example, applying the varnish for a lower film onto the substrate, followed by drying at normal pressure or under vacuum at 0 to 100° C., and preferably at normal pressure at 10 to 100° C.

Furthermore, examples of the lower film include lower films made of fiber materials such as cellulose resin, non-woven fabric (for example, polyimide non-woven fabric or the like. A fiber diameter is, for example, about 50 nm to about 3000 nm) and, polyimide film, and the like.

Furthermore, a burning step of burning the unburned composite film or a laminated film of the unburned composite film and the lower film to obtain a polyimide-fine particle composite film is carried out. When the unburned composite film or the lower unburned composite film is formed on the substrate, burning may be carried out as it is, or the unburned composite film or the laminated film of the unburned composite film and the lower film may be peeled off from the substrate before carrying out the burning step.

When the lower film in the laminated film is a lower unburned composite film formed by using the varnish for a lower film, and the composition of the varnish for a lower film is the same as the composition of the varnish for porous polyimide film production to be used for forming the unburned composite film, the laminated film of the unburned composite film and the lower film is substantially one layer (single layer). However, such a film is referred to as a "laminated film" in this specification.

When the unburned composite film or the laminated film of the unburned composite film and the lower unburned composite film is peeled from the substrate, the substrate provided with a mold release layer in advance can also be used in order to further enhance the releasability of the film. In a case of providing a mold release layer in the substrate in advance, the mold release agent is applied onto the substrate and is dried or baked before the application of the varnish. The mold release agent used here may be a known mold release agent, such as an alkylphosphate ammonium salt-based or fluorine-based agent or silicon, without particular restriction. When the dried unburned composite film is peeled from the substrate, a slight amount of the mold release agent remains on the surface of the peeled unburned composite film and may lead to discoloration during burning and adverse effects to the electrical characteristics, and the mold release agent should therefore be removed as much as possible. In order to remove the mold release agent, the unburned composite film or the laminated film of the unburned composite film and the lower unburned composite film peeled from the substrate is preferably washed with an organic solvent.

Alternatively, when the unburned composite film or the lower unburned composite film is directly used without being provided with a mold release layer in formation of the unburned composite film, the steps of forming the mold release layer and the washing step can be omitted.

[Production of Polyimide-Fine Particle Composite Film (Burning Step)]

The unburned composite film was heated as post-treatment (burning) into a composite film (polyimide-fine particle composite film) composed of a polyimide and fine particles. In the unburned composite film forming step, when the unburned composite film is formed on a lower film that is different from the unburned composite film, the lower film together with the unburned composite film is burned in the burning step. The burning temperature in the burning step varies depending on the structures of the unburned composite film and the lower film and the presence of a condensing agent and is preferably 120° C. to, 375° C. and more preferably 150° C. to 350° C. In a case of using an organic material for the fine particles, the burning temperature must be set to a temperature lower than the thermal decomposition temperature of the organic material. In the burning step, imidization is preferably completed.

The burning may be performed by, for example, a method of increasing the temperature from room temperature to 375° C. over 3 hours and then holding 375° C. for 20 minutes or a method of stepwise drying-thermal imidization by stepwise increasing the temperature by 50° C. from room temperature to 375° C. (holding the temperature of each step for 20 minutes) and finally holding 375° C. for 20 minutes. When the unburned composite film is formed on the substrate and the unburned composite film is peeled from the substrate once, an end of the unburned composite film may be fixed to, for example, a frame made of SUS stainless steel to prevent deformation.

The thickness of the resulting polyimide-fine particle composite film can be determined by, for example, measuring the thicknesses of a plurality of positions with a micrometer or the like and averaging the thicknesses. Preferred average film thickness varies depending on the purpose of the polyimide-fine particle composite film or the porous polyimide film, however, is preferably 5 to 500 μm and more preferably 10 to 100 μm, in the use as a separator for example.

[Porosification of Polyimide-Fine Particle Composite Film (Fine Particle-Removing Step)]

The porous polyimide film can be produced with high reproducibility by selecting an appropriate method for removing the fine particles from the polyimide-fine particle composite film.

For example, when silica is employed as the material of the fine particles, the silica can be removed by treating the polyimide-fine particle composite film with, for example, a low-concentration hydrogen fluoride solution to dissolve the silica.

Alternatively, an organic material may also selected as the material of the fine particles. Any organic material, which is decomposed at a temperature lower than polyimide, may be used. Examples of the fine particles include resin particulates composed of linear polymers and known depolymerizable polymers. The linear polymer usually has a molecular chain that is randomly cleaved during thermal decomposition; and the depolymerizable polymer is decomposed into a monomer during thermal decomposition. Both of them are decomposed into a low molecular weight substance or to $CO_2$ and disappear from the polyimide film. The resin fine particles to be used preferably have a decomposition temperature of 200° C. to 320° C. and more preferably 230° C. to 260° C. A decomposition temperature of 200° C. or more allows formation of a film even if the varnish contains a high boiling point solvent and broadens the selection of burning conditions of the polyimide. In addition, a decomposition temperature of lower than 320° C. allows the resin fine particles alone to disappear without thermally damaging the polyimide.

The total thickness of the porous polyimide film produced by production method of the present invention is not particularly limited and is preferably 5 μm or more and 500 μm or less, more preferably 10 μm or more and 100 μm or less, and most preferably 10 μm or more and 30 μm or less. The above-mentioned thickness can be determined by, for example, measuring the thicknesses of a plurality of positions with a micrometer or the like and averaging the thicknesses, as in the polyimide-fine particle composite film.

A layer formed of the varnish for porous polyimide film production according to the present invention has a thickness of, for example, 3 μm or more and 500 μm or less, preferably 4.3 μm or more and 500 μm or less, more preferably 4.5 μm or more and 99.7 μm or less, and further more preferably 5 μm or more and 29.7 μm or less. In the above-mentioned unburned composite film forming step, when the unburned composite film is formed on the lower layer that is different from the unburned composite film, the layer formed of the lower film has a thickness of, for example, 0.3 μm or more and 40 μm or less, preferably 0.3 μm or more and 5 μm or less, more preferably 0.4 μm or more and 4 μm or less, and further more preferably 0.5 μm or more and 3 μm or less. The thickness of each layer can be calculated by averaging thicknesses at a plurality of positions in a cross section of the porous polyimide film by observing under, for example, a scanning electron microscope (SEM).

[Polyimide-Removing Step]

A method for producing a porous polyimide film according to the present invention includes a polyimide-removing step of removing at least a part of a polyimide portion of a polyimide-fine particle composite film before the fine particle-removing step, or removing at least a part of the porous polyimide film after the fine particle-removing step. When at least a part of the polyimide-fine particle composite film is removed before the fine particle-removing step and when the fine particles are removed in the subsequent fine particle-removing step, when pores are formed, the aperture rate of the porous polyimide film of the final product can be improved as compared with the case where at least a part of the polyimide portion is not removed. Furthermore, when at least a part of the porous polyimide film is removed after the fine particle-removing step, the aperture rate of the porous polyimide film of the final product can be improved as compared with the case where the at least a part of the porous polyimide film is not removed.

The step of removing at least a part of the polyimide portion or the step of removing at least a part of the porous polyimide film can be carried out by a usual chemical etching or physical removing method, or a method combining these methods.

The chemical etching method includes treatment using a chemical etchant such as an inorganic alkaline solution or an organic alkaline solution. An inorganic alkaline solution is preferable. Examples of the inorganic alkaline solution include a hydrazine solution including hydrazine hydrate and ethylenediamine; a solution of alkaline metal hydroxide such as potassium hydroxide, sodium hydroxide, sodium carbonate, sodium silicate, and sodium metasilicate; an ammonium solution; an etchant including alkali hydroxide, hydrazine, and 1,3-dimethyl-2-imidazolidinone as a main component, or the like. Examples of the organic alkaline solution include an alkaline solution of primary amines such as ethyl amine and n-propyl amine; secondary amines such as diethyl amine and di-n-butylamine; tertiary amines such as triethylamine and methyl diethyl amine; alcohol amines such as dimethyl ethanol amine and triethanolamine; quaternary ammonium salts such as tetramethylammonium hydroxide and tetraethylammonium hydroxide; cyclic amines such as pyrrole and piperidine, or the like.

As a solvent for each solution, pure water and alcohols can be appropriately selected. Furthermore, solvents in which an appropriate amount of surfactant is added can be used. An alkali concentration is, for example, 0.01 to 20% by mass.

Furthermore, examples of the physical method include dry etching by plasma (oxygen, argon, etc.), corona discharge, or the like, a method for treating a surface of a polyimide film by dispersing abrasives (for example, alumina (rigidity 9), or the like) in a liquid and irradiating the surface of aromatic polyimide film with the liquid at the irradiation rate of 30 to 100 m/s, and the like.

The above-mentioned methods are preferable because they are applicable in the polyimide-removing step before the fine particle-removing step or after the fine particle-removing step.

On the other hand, as the physical method that can be applied only to the polyimide-removing step carried out after the fine particle-removing step, a method of compression bonding a mount film (for example, a polyester film such as a PET film) whose subject surface is wetted with liquid and then peeling a porous polyimide film from the mount film after drying or without drying can be employed. Due to the surface tension of the liquid or electrostatic adhesion, the porous polyimide film is peeled from the mount film with only the surface layer of the porous polyimide film left on the mount film.

[Use of Porous Polyimide Film]

The porous polyimide film produced by the method of the present invention can be used as the separator of a lithium-ion battery, a fuel cell electrolyte film, a film for separating a gas or liquid, or a low dielectric constant material. The above-mentioned porous polyimide film can be used as the separator for a secondary battery, such as a nickel cadmium or nickel hydrogen battery or a lithium ion secondary battery and is particularly preferably used as the porous separator for a lithium ion secondary battery. In particular, when the porous polyimide film is used as the separator for a lithium-ion battery, in the unburned composite film forming step, the unburned composite film is formed on a lower film that is different from the unburned composite film, a lower film that has been formed using the varnish for the lower film production is used as the lower film, and a surface at a lower film side is arranged at the negative electrode side of the lithium ion battery. Thus, the battery performance can be improved.

Secondary Battery

The secondary battery in the present invention is characterized in that an electrolytic solution and a separator formed of a porous polyimide film produced by a production method according to the present invention are arranged between the negative electrode and the positive electrode.

The secondary battery of the present invention may be of any type and may have any configuration. The secondary battery is not particularly limited to known secondary batteries such as nickel cadmium and nickel hydrogen batteries as well as a lithium ion secondary battery, as long as the battery has a configuration in which battery elements laminated with a positive electrode, a separator, and a negative electrode in this order so as to satisfy the above-described requirements, are impregnated with an electrolytic solution and are encapsulated in an outer package.

The negative electrode of the secondary battery of the present invention can have a structure in which a negative electrode mixture composed of a negative electrode active material, a conductive auxiliary agent, and a binder is formed on a collector. For example, as the negative electrode active material, cadmium hydroxide can be used in nickel cadmium batteries, and a hydrogen-occlusion alloy can be used in nickel hydrogen batteries. In lithium ion secondary batteries, a material that can be electrochemically doped with lithium can be employed. Examples of such active materials include carbon materials, silicon, aluminum, tin, and Wood's alloy.

Examples of the conductive auxiliary agent constituting the negative electrode include carbon materials such as acetylene black and Ketjen black. The binder is composed of an organic polymer, and examples thereof include polyvinylidene fluoride and carboxymethyl cellulose. The collector can be, for example, copper foil, stainless steel foil, or nickel foil.

The positive electrode can have a structure in which a positive electrode mixture composed of a positive electrode active material, a conductive auxiliary agent, and a binder is formed on a collector. For example, the positive electrode active material can be nickel hydroxide in nickel cadmium batteries and can be nickel hydroxide or nickel oxyhydroxide in nickel hydrogen batteries. Meanwhile, in lithium ion secondary batteries, examples of the positive electrode active material include lithium-containing transition metal oxides, specifically, $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, and $LiAl_{0.25}Ni_{0.75}O_2$. Examples of the conductive auxiliary agent include carbon materials such as acetylene black and Ketjen black. The binder is an organic polymer, and examples thereof include polyvinylidene fluoride. The collector can be, for example, aluminum foil, stainless steel foil, or titanium foil.

The electrolytic solution in, for example, a nickel cadmium battery or a nickel hydrogen battery is a potassium hydroxide solution. The electrolytic solution in a lithium ion secondary battery is composed by dissolving a lithium salt in a non-aqueous solvent. Examples of the lithium salt include $LiPF_6$, $LiBF_4$, and $LiClO_4$. Examples of the non-aqueous solvent include propylene carbonate, ethylene carbonate, dimethyl carbonate, diethyl carbonate, ethyl methyl carbonate, γ-butyrolactone, and vinylene carbonate. These solvents may be used alone or as a mixture.

Examples of the outer package material include metal cans and aluminum laminate packs. The shape of the battery is, for example, a rectangular shape, a cylindrical shape, or a coin shape; however, the separator formed of a porous polyimide film produced by a production method according to the present invention can be suitably applied to any shape.

EXAMPLES

The present invention will now be more specifically described with reference to Examples, but the scope of the present invention is not limited to the following Examples.

In Examples and Comparative Examples, the following tetracarboxylic dianhydride, diamine, organic solvents, dispersants, and fine particles were used.
Polyamide acid solution: reaction product between tetracarboxylic dianhydride (pyromellitic acid dianhydride) and diamine (4,4'-diaminodiphenylether) (reaction solvent: N,N-dimethylacetamide)

Dispersant 1: polyoxyethylene secondary alkyl ether dispersant
Dispersant 2: polyoxyethylene allylphenyl ether phosphate anionic surfactant
Fine Particles
Silica (1): silica having an average particle diameter of 300 nm
Silica (2): silica having an average particle diameter of 700 nm

[Preparation of Varnish]
(1) First Varnish (Varnish for Lower Film)
Silica 1 (85 parts by mass) and each organic solvent of N,N-dimethylacetamide and γ-butyrolactone were added to a polyamide acid solution (polyamide acid basis: 15 parts by mass) (at the time, an addition amount of the organic solvent was adjusted so that the ratio of the organic solvent in the varnish (N,N-dimethylacetamide:γ-butyrolactone) was 90:10 (mass ratio)). The components were mixed, and the mixture was stirred to prepare a first varnish having a volume ratio of polyamide acid to fine particles of 22:78 (mass ratio: 15:85).

(2) Second Varnish (Varnish for Porous Polyimide Film Production)
A polyamide acid solution, silica 2 and a dispersant were mixed in types and amounts shown in Table 1 (unit: parts by mass), and each organic solvent of N,N-dimethylacetamide and γ-butyrolactone was added if necessary (at the time, an addition amount of the organic solvent was adjusted so that the ratio of the organic solvent in the varnish (N,N-dimethylacetamide: γ-butyrolactone) was 90:10 (mass ratio)) to prepare a second varnish having the solid content concentration shown in Table 1. The viscosity of the second varnish at 25° C. was measured using E-type viscometer. The results are shown in Table 1. Note here that in Table 1, the amount of the polyamide acid solution is represented on the basis of polyamide acid in this solution. Furthermore, in Table 1, the molecular weight of polyamide acid was a measurement value of gel permeation chromatography (GPC) on the basis of polystyrene.

TABLE 1

| | Second varnish (varnish for porous polyimide film production) | | | | | | |
|---|---|---|---|---|---|---|---|
| | Polyamide acid solution (part by mass) | Silica (part by mass) | Dispersant 1 (part by mass) | Dispersant 2 (part by mass) | Solid content concentration (% by mass) | Viscosity (mPa · s) | Molecular weight of polyamide acid |
| Example 1 | 19.6 | 80 | 0.4 | 0 | 35 | 968 | 104300 |
| Example 2 | 19.48 | 80 | 0.52 | 0 | 35 | 970 | 104300 |
| Example 3 | 19.36 | 80 | 0.64 | 0 | 35 | 985 | 104300 |
| Example 4 | 19.84 | 80 | 0.16 | 0 | 35 | 965 | 104300 |
| Example 5 | 19.76 | 80 | 0.24 | 0 | 35 | 971 | 104300 |
| Example 6 | 19.68 | 80 | 0.32 | 0 | 35 | 969 | 104300 |
| Example 7 | 19.6 | 80 | 0 | 0.4 | 35 | 987 | 104300 |
| Example 8 | 20 | 80 | 0 | 0 | 35 | 993 | 104300 |
| Comparative Example 1 | 19.6 | 80 | 0.4 | 0 | 30 | 352 | 104300 |
| Example 9 | 19.6 | 80 | 0.4 | 0 | 35 | 1052 | 108000 |
| Example 10 | 19.76 | 80 | 0.24 | 0 | 35 | 1100 | 108000 |
| Comparative Example 2 | 19.84 | 80 | 0.16 | 0 | 30 | 412 | 108000 |
| Comparative Example 3 | 19.84 | 80 | 0.16 | 0 | 31 | 497 | 108000 |
| Example 11 | 19.84 | 80 | 0.16 | 0 | 32 | 601 | 108000 |
| Example 12 | 19.84 | 80 | 0.16 | 0 | 33 | 759 | 108000 |
| Example 13 | 19.84 | 80 | 0.16 | 0 | 34 | 968 | 108000 |
| Example 14 | 19.84 | 80 | 0.16 | 0 | 35 | 1116 | 108000 |
| Example 15 | 19.6 | 80 | 0.4 | 0 | 35 | 2439 | 120000 |
| Example 16 | 19.6 | 80 | 0.4 | 0 | 35 | 2132 | 154200 |

TABLE 1-continued

| | Second varnish (varnish for porous polyimide film production) | | | | | | |
|---|---|---|---|---|---|---|---|
| | Polyamide acid solution (part by mass) | Silica (part by mass) | Dispersant 1 (part by mass) | Dispersant 2 (part by mass) | Solid content concentration (% by mass) | Viscosity (mPa·s) | Molecular weight of polyamide acid |
| Example 17 | 19.2 | 80 | 0.8 | 0 | 30 | 719 | 154200 |
| Example 18 | 19.84 | 80 | 0.16 | 0 | 30 | 719 | 154200 |
| Example 19 | 19.84 | 80 | 0.16 | 0 | 30 | 643 | 154200 |
| Comparative Example 4 | 19.84 | 80 | 0.16 | 0 | 25 | 238 | 154200 |
| Comparative Example 5 | 19.84 | 80 | 0.16 | 0 | 28 | 442 | 154200 |

[Formation of Polyimide-Fine Particle Composite Film (Single Layer)]

The above-mentioned second varnish was applied onto a PET film using an applicator, the applied film was subjected to pre-baking at 70° C. for 5 minutes to form an unburned composite film (single layer) having a thickness of about 25 μm.

The unburned composite film was peeled off from the PET film, followed by thermal treatment at 320° C. for 15 minutes to complete imidization. Thus, a polyimide-fine particle composite film (single layer) was obtained.

[Formation of Polyimide-Fine Particle Composite Film (Double Layer)]

The above-mentioned first varnish was applied onto a PET film using an applicator, the applied film was subjected to pre-baking at 70° C. for 1 minute to form a the lower unburned composite film having a thickness of about 3 μm. Subsequently, a film of the second varnish was formed thereon using an applicator. Pre-baking at 70° C. for 5 minutes was performed to form an unburned composite film having a thickness of 25 μm.

A laminated film of the lower unburned composite film and the unburned composite film was peeled off from the PET film, followed by thermal treatment at 320° C. for 15 minutes to complete imidization. Thus, a polyimide-fine particle composite film (double layer) was obtained.

[Formation of Porous Polyimide Film (Single Layer or Double Layer)]

The polyimide-fine particle composite film (single layer or double layer) was immersed in a 10 mass % HF solution for ten minutes to remove the fine particles contained in the film to obtain a porous polyimide film (single layer or double layer).

[Chemical Etching]

A 2.38 mass % TMAH aqueous solution was diluted with a 50 mass % methanol aqueous solution so that the concentration became 1.04% to form an alkaline etchant. A porous polyimide film (single layer or double layer) was immersed in the etchant for 80 seconds to remove a part of a surface of polyimide.

[Evaluation]

Film properties of the unburned composite film (single layer), the laminated film, the polyimide-fine particle composite film (single layer or double layer), and the porous polyimide film (single layer or double layer) obtained above were evaluated. The results are shown in Table 2. In Table, the "single layer" shows results of the film properties obtained by using an unburned composite film (single layer) obtained in "Formation of polyimide-fine particle composite film (single layer)" as a starting material. The "double layer" shows results of film properties obtained by using a laminated film obtained in "Formation of polyimide-fine particle composite film (double layer)" as a starting material.

(Presence of Sea-Island Structure)

A surface of the obtained unburned composite film (single layer) or the unburned composite film in the obtained laminated film was observed by visual observation so as to evaluate presence of a sea-island structure. The evaluation criteria are as follows.

◯: No sea-island structure was observed.

Δ: Sea-island structure was hardly observed.

X: Sea-island structure was clearly observed.

(Drying Property, Peelability)

When an unburned composite film (single layer) was peeled from a PET film, or a laminated film of a lower unburned composite film and an unburned composite film was peeled from a PET film, the drying property of the second varnish and the peelability of the laminated film were evaluated. The evaluation criteria are as follows.

◯: After drying, film was naturally peeled off. or no adhesion of film was left at the time of peeling.

Δ: Some adhesion of film was left at the time of peeling.

(Presence of Occurrence of Scale Patterns)

A porous polyimide film after chemical etching was observed by visual observation and the presence of occurrence of a scale pattern was evaluated. The evaluation criteria are as follows.

◯: No scale pattern was observed.

X: Scale pattern was observed on the entire surface.

(Air Permeability)

A porous polyimide film before chemical etching and a porous polyimide film after chemical etching were cut into 5-cm square of samples for measurement of air permeability. Time for 100 ml of air passing through each of the samples was measured with a Gurley densometer (manufactured by Toyo Seiki Co., Ltd.) in accordance with JIS P 8117. As a result, in any case, the air permeability, which had been 130 seconds or more before chemical etching, was improved to the air permeability of less than 120 seconds after chemical etching. Note here that a change amount in the film thickness before and after the chemical etching was hardly observed. Accordingly, it is thought that the aperture rate of the surface of the porous polyimide film and the hole diameter size of a communicating hole inside the porous polyimide film was increased and the air permeability is improved.

TABLE 2

| | Sea-island structure | | Drying property, Peelability | | Scale pattern | |
|---|---|---|---|---|---|---|
| | Single layer | Double layer | Single layer | Double layer | Single layer | Double layer |
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | Δ | ○ | ○ |
| Comparative Example 1 | X | X | ○ | ○ | X | X |
| Example 9 | ○ | ○ | ○ | ○ | ○ | ○ |
| Example 10 | ○ | ○ | ○ | ○ | ○ | ○ |
| Comparative Example 2 | X | X | ○ | ○ | X | X |
| Comparative Example 3 | X | X | ○ | ○ | X | X |
| Example 11 | Δ | Δ | ○ | ○ | ○ | ○ |
| Example 12 | ○ | ○ | ○ | ○ | ○ | ○ |
| Example 13 | ○ | ○ | ○ | ○ | ○ | ○ |
| Example 14 | ○ | ○ | ○ | ○ | ○ | ○ |
| Example 15 | ○ | ○ | ○ | ○ | ○ | ○ |
| Example 16 | ○ | ○ | ○ | ○ | ○ | ○ |
| Example 17 | ○ | ○ | ○ | ○ | ○ | ○ |
| Example 18 | ○ | ○ | ○ | ○ | ○ | ○ |
| Example 19 | ○ | ○ | ○ | ○ | ○ | ○ |
| Comparative Example 4 | X | X | ○ | ○ | X | X |
| Comparative Example 5 | X | X | ○ | ○ | X | X |

As is apparent from Tables 1 and 2, in Examples, a second varnish (a varnish for porous polyimide film production) having viscosity at 25° C. of not less than 550 mPa·s was used, occurrence of a sea-island structure and a scale pattern was sufficiently suppressed. On the contrary, in Comparative Examples, a second varnish (a varnish for porous polyimide film production) having a viscosity at 25° C. of less than 550 mPa·s was used, occurrence of a sea-island structure and a scale pattern was not be able to be suppressed.

As is apparent from comparison between Example 8 and other Examples, it was demonstrated that when the second varnish (a varnish for porous polyimide film production) contained a dispersant, the drying property of the second varnish (a varnish for porous polyimide film production) and the peelability of the laminated film of the lower unburned composite film and the unburned composite film was improved.

The invention claimed is:

1. A varnish comprising a resin, fine particles, and a solvent, wherein
    the resin includes polyamide acid and/or polyimide,
    a content of the fine particles is not less than 65% by volume with respect to a total of the resin and the fine particles,
    the fine particles have a particle diameter distribution index (d25/d75) in a range of not less than 1.6 and not more than 5, and
    a viscosity at 25° C. of the varnish is not less than 550 mPa·s.

2. The varnish according to claim 1, further comprising a dispersant.

3. A method for producing a porous polyimide film, the method comprising:
    forming an unburned composite film using the varnish as defined in claim 1;
    burning the unburned composite film to obtain a polyimide-fine particle composite film; and
    removing the fine particles from the polyimide-fine particle composite film.

4. The method according to claim 3, wherein
    in the forming, the unburned composite film is formed on a lower film, the lower film being formed with another varnish comprising a resin including polyamide acid and/or polyimide, fine particles, and a solvent; and
    in the burning, the lower film together with the unburned composite film is burned.

5. The varnish according to claim 1, wherein the varnish is used for porous polyimide film production.

6. The varnish according to claim 1, wherein a mass ratio of the fine particles to the resin is in a range of 2 to 6, with the proviso that the fine particles are inorganic particles, or the mass ratio of the fine particles to the resin is in the range of 1 to 3.5, with the proviso that the fine particles are organic particles.

7. The varnish according to claim 2, wherein the dispersant is selected from the group consisting of anionic surfactants, cationic surfactants, amphoteric surfactants, nonionic surfactants, fatty acid alkyl esters, polyester polyols, and any combination thereof, and
    the dispersant is contained in a range of 0.01 to 5% by mass with respect to the fine particles.

8. The method according to claim 3, further comprising removing a part of a polyimide portion of the polyimide-fine particle composite film, before or after removing the fine particles.

* * * * *